US012138954B2

(12) United States Patent
Simmons

(10) Patent No.: US 12,138,954 B2
(45) Date of Patent: Nov. 12, 2024

(54) BRUSH HOLDER FOR A PAINT CAN

(71) Applicant: Calvin Simmons, Suffolk, VA (US)

(72) Inventor: Calvin Simmons, Suffolk, VA (US)

( * ) Notice: Subject to any disclaimer, the term of this patent is extended or adjusted under 35 U.S.C. 154(b) by 92 days.

(21) Appl. No.: 17/899,743

(22) Filed: Aug. 31, 2022

(65) Prior Publication Data

US 2023/0105295 A1 Apr. 6, 2023

Related U.S. Application Data

(60) Provisional application No. 63/251,854, filed on Oct. 4, 2021.

(51) Int. Cl.

| | |
|---|---|
| ***B44D 3/12*** | (2006.01) |
| ***A46B 17/00*** | (2006.01) |
| ***H01F 7/02*** | (2006.01) |

(52) U.S. Cl.

CPC .............. *B44D 3/123* (2013.01); *A46B 17/00* (2013.01); *H01F 7/02* (2013.01); *A46B 2200/202* (2013.01)

(58) Field of Classification Search

CPC ....................................................... B44D 3/123

See application file for complete search history.

(56) References Cited

U.S. PATENT DOCUMENTS

| | | | | |
|---|---|---|---|---|
| 3,536,285 A * | 10/1970 | James | B44D 3/123 | 248/309.4 |
| 4,865,282 A * | 9/1989 | Yonkman | B44D 3/123 | 220/736 |
| 5,413,296 A * | 5/1995 | LaFontaine | E06C 7/14 | 248/312.1 |
| 5,727,717 A * | 3/1998 | Vigne | G09B 23/34 | 403/DIG. 1 |
| 11,794,512 B1 * | 10/2023 | Waggoner | B44D 3/123 | |
| 2005/0156085 A1 * | 7/2005 | Radovan | A46B 17/02 | 248/213.2 |

* cited by examiner

*Primary Examiner* — Stephen J Castellano

(74) *Attorney, Agent, or Firm* — Brennan, Manna & Diamond, LLC

(57) ABSTRACT

The present invention relates to a temporary paint brush storage device. The device is designed to hold a paint brush in an upright position within a paint can. The storage device is in the shape of inverted “J” and is coated with a protective material. The storage device is supported by the rim of a paint can and magnetically attaches to a metal ferrule of a paint brush. The storage device may further comprise one or more additional attachment points to store additional paint brushes or painting accessories on the exterior of a paint can.

2 Claims, 7 Drawing Sheets

BRUSH HOLDER FOR A PAINT CAN

CROSS-REFERENCE TO RELATED APPLICATION

The present application claims priority to, and the benefit of, U.S. Provisional Application No. 63/251,854, which was filed on Oct. 4, 2021, and is incorporated herein by reference in its entirety.

FIELD OF THE INVENTION

The present invention relates generally to the field of painting accessories. More specifically, the present invention relates to a magnetic device designed to hold a paint brush in an upright position within the interior of a paint can, and a possible painting accessory on the exterior of a paint can. Accordingly, the present disclosure makes specific reference thereto. Nonetheless, it is to be appreciated that aspects of the present invention are also equally applicable to other applications, devices, and methods of manufacture.

BACKGROUND

Devices for holding paint brushes are generally desired in the art as they improve workspace organization and can help both facilitate and expedite the overall painting process by eliminating the need to search for a paint brush when the it is not in use. Within the painting industry, one area of concern is increasing the longevity of paint brushes and paint brush bristles. More specifically, paint brush bristles can become easily damaged if the brush is not stored with care when not in use, or if the paint brush is not properly cleaned and cared for. While painting on a ladder or in other hard to reach places, there are a multitude of reasons for needing to set a brush down, such as having to move a ladder, add additional masking tape and tarps to protect the areas surrounding that which is being painted, taking a phone call, or talking to other workers.

Unfortunately, when a paint brush is set down in a place where it should not be (e.g., a dirty surface, in the grass, etc.), the bristles of the paint brush can easily get bent out of shape, particularly if the paint is left to dry on the bristles. Further, the wet paint on the now deformed bristles will harden, and in turn, may ruin the paint brush.

Furthermore, painting on a ladder can be very dangerous. General ladder safety recommends that at least one hand be in contact with the ladder at all times. Trying to maintain control of a paint brush, a paint bucket, other tools, and painting accessories, and having at least have one hand in contact with the ladder at all times can be very cumbersome if not impossible. Accordingly, a painter should not have to think about finding a place to put his or her paint brush while up on a ladder. All focus should be on painting and maintaining safe practices. Falling from a ladder can easily result in great bodily harm, or even death.

Additionally, painters typically like to bring more than just a paint bucket and a paint brush with them when working on a particular job. They often also bring drip rags that are used to wipe off excess drips of paint from where they are painting, as well as tarps or protective sheeting to protect furniture, floors, and other areas that the painter does not want to splatter with paint. Therefore, there is oftentimes a need to hold or store various painting accessories when not in use, and not just a paint brush.

Not wasting materials is also very important in any job, and this is also true in the field of painting. Certain types of paint can be very expensive, and therefore needs to be handled and stored with care. If a wet paint brush is set down haphazardly, the wet paint may drip from the brush and onto the surface beneath it. Also, depending on the angle at which the brush is set down, the paint could even end up on the handle of the brush and then in contact with the hand of the user. This not only potentially wastes large amounts of paint, but it could also make the handle of the brush less suitable for future use.

Therefore, there exists a long-felt need in the art for a magnetic paint brush holder that provides users with a place to temporarily store a paint brush in an upright position in the interior space of a paint can when not in use. There is also a long-felt need in the art for a paint brush storage device that holds brushes in a way that prevents the bristles of the brush from splaying out of alignment, or otherwise becoming bent or damaged. Further, there is a long-felt need in the art for a paint brush holder device that can help painters and other workers be more organized and safer while painting on a ladder. Moreover, there is a long-felt need in the art for a painting accessory that comprises an additional hook positioned on an exterior surface of a paint can that may accommodate additional paint brushes or painting accessories. Finally, there is a long-felt need in the art for a paint brush storage device that will reduce the amount of paint that is wasted after the paint brush has been used and that extends the paint brush outwardly from the holder device to reduce the possibility of paint getting on the handle of the brush.

The subject matter disclosed and claimed herein, in one embodiment thereof, comprises a painting brush holder for a paint can in the form of a magnetic supporting tool for storing a paint brush in an upright position within the interior of a paint can so that the force of gravity can be used to allow paint from the brush to drip back into the paint can, and eliminate waste. The hook like device is comprised of a base with an integrated magnet that may be covered in a thin plastic or an anti-corrosive coating to prevent the magnet from rusting when exposed to moisture. Further, the brush holder device may further comprise additional attachment points or hooks for also temporarily storing other painting accessories.

In this manner, the painting accessory used for brush storage of the present invention accomplishes all of the foregoing objectives and provides users with a device that can be used to temporarily store paint brushes in a safe and convenient manner. The device allows a user to safely store multiple sizes of paint brushes in a way that will not damage the bristles of the brush. The device will also be able to store paint brushes in a way that will allow excess paint to drip back into the can and in turn, minimize waste of the paint.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a paint brush storage device. The device is preferably a magnetic tool for temporarily storing a paint brush in an upright position within the interior of a paint can to prevent the bristles of the brush from splaying out of their original alignment, and to allow any remaining paint on the brush to drip down into the paint can where it can be reused. The storage device is preferably a clip-like device having a first leg, a second leg, a top portion and an integrated magnet that extends outwardly from an exterior surface of the leg positioned within the interior space of the paint can. The device may be comprised of a metal, durable plastic, or any other suitable material, and may further comprise an anti-corrosive coating. In a further embodiment, the paint brush holder device may also comprise an additional hook-like structure or other attachment point positioned on the exterior of the paint can for storing additional paint brushes or painting accessories. The hook-like structure may be in the form of a double "J" or "L" hook.

The present invention provides a safe and convenient way to store one or more paint brushes and other accessories while the same are still being used on a job and frees up the hands of the painter for use on other tasks, such as holding onto the ladder. The brush holder can store multiple and different shapes and sizes of paint brushes, as well as other paint applicators, such as paint rollers, pads, etc. The size versatility is achieved by having a device and magnet combination that is strong enough to withstand the weight of larger brushes or paint applicators, even if the brush or applicator is covered with paint or other coating material. In a preferred embodiment, the magnet attaches to the metal portion or ferrule of the paint brush that connects the handle and the bristles of the brush.

In one embodiment, the base component comprises a hook shaped configuration that is designed to attach to a paint can. Specifically, the base component is comprised of a pair of legs that are connected in a substantially parallel and spaced apart configuration by a centerpiece. The centerpiece is sized and configured to rest or sit on the rim of the paint can while the two main legs extend downwardly therefrom along the interior and exterior walls of the can, respectively. Each of pair of legs is disposed in a perpendicular arrangement to the centerpiece, and the leg that is adjacent the interior wall of the paint can is the leg that houses the magnet. The magnet acts as an anchoring agent that helps secure the metal ferrule of the paint brush to the paint brush holder device in a suspended configuration above the level of remaining paint in the paint can.

In one embodiment, the base component is sized to accommodate the dimensions of a normal size (one gallon) paint can. A one-gallon paint can is about 7.5 inches tall and has a diameter of around 6.5 inches. The rim of the can is also about 0.5 inches wide. With these dimensions in mind, the interior leg of the hook should have a length of about 3 to about 4.5 inches, and the exterior leg should have a length of about 2 to 2.5 inches. The center connector should have a width of about 1 to 1.5 inches to accommodate the width of the paint can rim. Nonetheless, any other dimensions could be sufficient as known in the art, depending on the wants and needs of the user or the particular type and size of paint can that is being used for the painting project. In the event that the paint can is not comprised of metal and is instead plastic or other non-magnetic material, then the device will still perform its function by being hung over the rim or top edge of the paint can.

In another embodiment, the two opposing interior and exterior legs are held together by a middle or top connecting piece. Preferably, the interior leg is nearly twice as long as the exterior leg and may be provided with an extension piece so that the interior leg can reach the bottom of the can to stabilize the device in the can if so desired. The interior leg is longer because it plays a more crucial role in the stabilizing of the entire paint brush holder device, and it supports the magnet and the weight of the paint brush attached thereto. The magnet may also be attached to the interior surface of the metal can, and in turn securely fastens the hook to the can. Having the interior leg longer also keeps the paint brush closer to the paint. The closer the paint brush is stored to the remaining paint in the can when not in use, the quicker the brush may be reinserted into the paint to resume the painting task. In this manner, the design not only expedites the painting process, but it also helps keep the positioning of the overall device secure. Nonetheless, any other suitable securing means can also be utilized to secure the hook in position and the interior leg and extension portion may further comprise a plurality of openings to allow paint to pass through the leg.

In one embodiment, the hook is capable of holding a variety of paint brush shapes and sizes. The strength of the magnet allows it to withstand the weight of the larger brush while still being sensitive enough to be attracted to the smaller brushes.

In another embodiment, the shorter exterior leg of the hook houses another, smaller hook. This hook can be used to help transport or store other painting or related accessories, such as a drip rag.

In yet another embodiment, the metal core of the paint brush storage hook is manufactured from a metal, such as aluminum, stainless steel, etc., and the exterior coating around the metal core may be manufactured from a plastic or a polymer such as, but not limited to, Polyethylene Terephthalate (PET), High-Density Polyethylene (HDPE), or Low-Density Polyethylene (LDPE).

In yet another embodiment, the paint brush storage device may comprise a plurality of indicia, and the magnet may be permanently or removably secured to the interior leg of the paint brush holder device. Additionally, the magnet may extend outwardly from the surface of the interior leg to secure the brush at a desired distance away from the paint brush holder device to further reduce the possibility that paint gets on the handle of the brush while the same is being stored.

In yet another embodiment, a method of securing a paint brush safely in a vertical position in the interior of a paint can when temporarily not in use is described. The method comprises the steps of providing a paint brush holder device having a magnetic attractive force and installing the same on a paint can. The method further comprises the steps of aligning the metal centerpiece of the paint brush with the magnet on the interior leg of the hook in the interior of the can, and then attaching the metal centerpiece of the paint brush to the magnet to store the paint brush in a secure way that will not damage the bristles and that will permit any remaining paint on the brush to drip down into the paint can. The magnets may be one of neodymium iron boron magnets, samarium cobalt magnets, aluminum nickel cobalt magnets and ferrite permanent magnets.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents.

Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
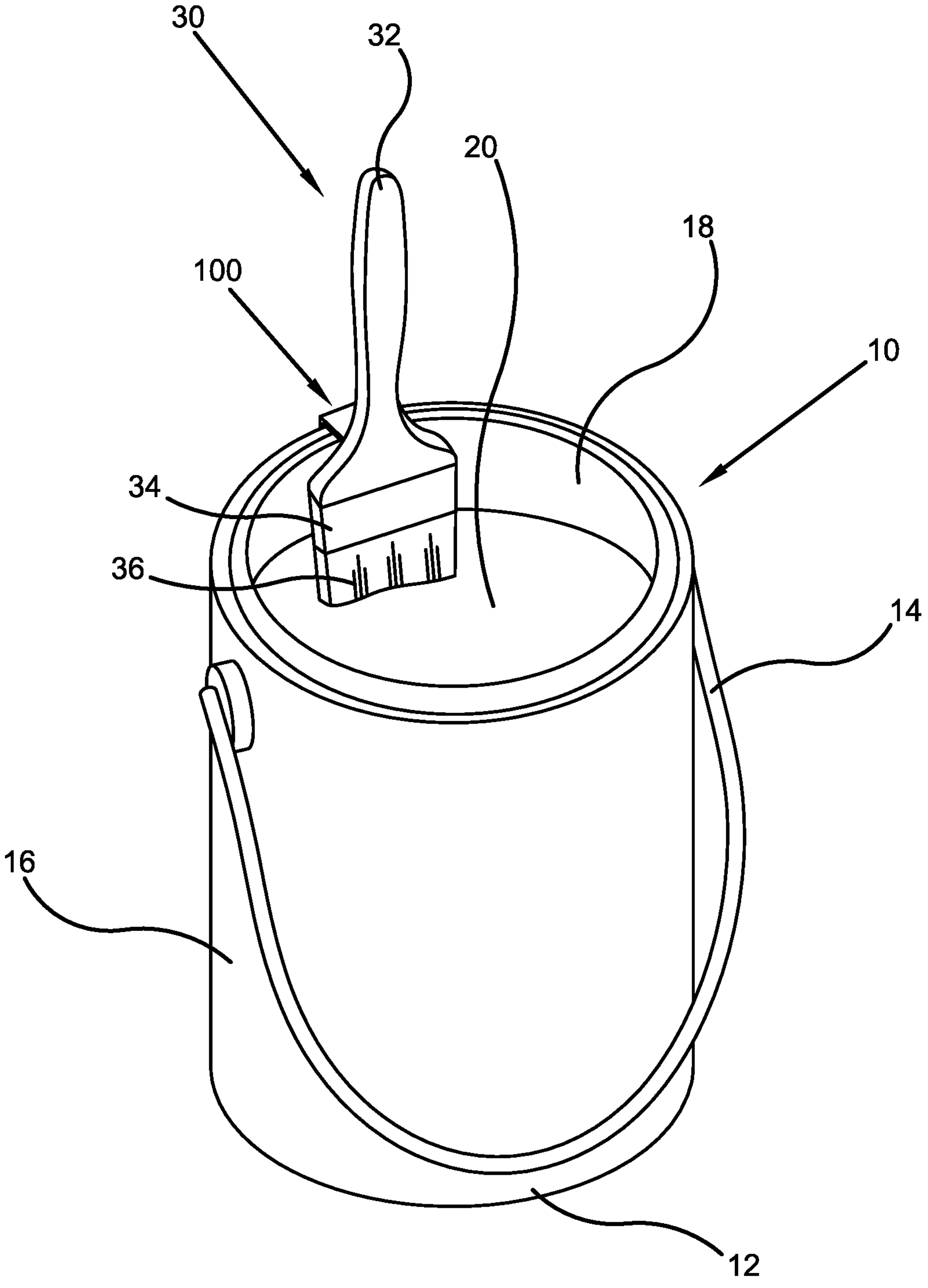
FIG. 1 illustrates a perspective view of one potential embodiment of the paint brush storage device of the present invention being used to temporarily store a paint brush in a vertical orientation in an interior of a paint can in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

Therefore, there exists a long-felt need in the art for a magnetic paint brush hook that provides users with a place to temporarily store a paint brush in an upright position in an interior of a paint can. There is also a long-felt need in the art for a paint brush storage device that holds the brush in a way that prevents the bristles of the brush from splaying out of alignment and from becoming bent or damaged, thereby maintaining the toe or tip of the brush in an original condition. Further, there is a long-felt need in the art for a paint brush holder device that helps painters be more organized in the workplace and safer while using a ladder. Moreover, there is a long-felt need in the art for a device that has an additional hook on the front or exterior surface of the paint can, to permit the storage of additional accessories. Finally, there is a long-felt need in the art for a paint brush storage device that will reduce the amount of paint that is wasted after the use of the brush.

The present invention, in one exemplary embodiment, is a magnetic paint brush storage device or holder. The device is a painting accessory that is designed specifically to hold paint brushes in an upright position and at the ready for use by a painter. The device is preferably comprised of a clip-like device for placement over the rim of a paint can and a magnet positioned on an interior leg of the device for securing a paint can in a desired orientation in an interior of a paint can. More specifically, the ferrule of the paint brush will magnetically and removably attach to the magnet of the holder device such that the paint brush is positioned in a generally vertical orientation with the brush bristles slightly above the remaining level of paint in the paint can.

The magnet is strong enough so that it can hold a variety of different size paint brushes, and may be one of neodymium iron boron magnets, samarium cobalt magnets, aluminum nickel cobalt magnets and ferrite permanent magnets. In a further embodiment, the holder device further comprises a second attachment point on the exterior leg for supporting additional paint brushes or other painting accessories on an exterior of the paint can but in close proximity to the user for easy access. Such painting accessories may include, but are not limited to, a drip rag, putty knife, scraper, paint can opener, as well as non-painting accessories such as, a cell phone which may be placed within a holder or pocket and then suspended from the hook.

A method of securing a paint brush safely in a vertical position for storage is also described herein. The method comprises the steps of providing a paint brush holder device having a magnetic attractive force and installing the same on a paint can. The method further comprises the steps of aligning the metal centerpiece of the paint brush with the magnet on the interior leg of the hook in the interior of the can, and then attaching the metal centerpiece of the paint brush to the magnet to store the paint brush in a secure way that will not damage the bristles and that will permit any remaining paint on the brush to drip down into the paint can. Finally, the paint brush can be easily removed from the device by pulling the metal centerpiece or ferrule of the paint brush away from the magnet, in turn releasing the brush from the magnetic pull of the magnet.

Referring initially to the drawings, FIG. 1 illustrates a perspective view of one potential embodiment of the paint brush storage device 100 of the present invention. In the present embodiment, the paint brush storage device 100 is an improved paint brush storage device that provides users with a place to momentarily and conveniently store their paint brushes in an upright position. The device 100 is specifically designed to allow any user to store a paint brush in a manner that will not bend or damage the bristles 36 of the brush and thus maintain the tip or toe of the brush in a desired configuration.

More specifically, the device 100 includes a first leg 102 having a first length, a connector or top portion 104, and a second leg 106 having a length different than that of the first leg. The top or connector portion 104 has a third length which is different than either of the first and second legs, and shorter than both of the first and second legs. Each of the first leg 102 and second leg 106 extend perpendicularly downward from the top portion 104 when positioned on a paint can, and the first and second legs are generally parallel to one another and spaced apart by a distance equal to the third length. The second leg 106 is the leg on the interior 18 of the paint can 10 in which the magnet 108 is housed and the ferrule of the brush is attached. The magnet 108 is preferably of a suitable strength to support a wide variety of sizes of brushes 30 securely to the brush hook 100.

The brush hook 100 is mounted on to a paint can 10 to safely store a paint brush 30. A paint can 10 has four main parts: a base 12, a can handle 14, an exterior side wall 16 and an interior wall 18. Paint 20 or other spreadable materials, such as a stain, varnish, primer or the like, is typically stored in the interior of the can paint 10 and is, in turn, spread by the paint brush 30. A paint brush 30 is generally comprised of a brush handle 32, a metal connector or ferrule 34 and a plurality of bristles 36 extending outwardly from the ferrule 34 in a direction opposite that of the handle 32 and culminating in a brush tip or toe.

Referring again to FIG. 1, the painting accessory brush hook 100 is used to secure a paint brush 30 in place. The paint brush 30 is being held in place vertically adjacent to the interior wall 18 of the paint can 10, wherein the plurality of bristles 36 are facing downward towards the remaining paint 20 in the can, and the brush handle 32 extends outwardly from the open can for easy retrieval by a user. The metal connector or ferrule 34 in the middle of the brush is magnetically attached to the magnet 108 that is housed on the second leg 106 of the brush hook 100. The magnet 108 preferably extends outwardly from the second leg 106 by a distance of up to 0.25 inches to hold the paint brush in a slightly spaced apart relationship to the surface of the second leg 106 to prevent paint from transferring to the handle of the paint brush.

By way of background, most standard one-gallon paint cans 10 have a height of 7.5 inches and a diameter of 6.5 inches, wherein the rim that runs along the top of the paint can 10 usually has a width of about 0.5 inch. Therefore, the brush holder 100 of the present invention should be designed to accommodate these particular dimensions, though it is contemplated that the brush holder 100 may also be sized and configured accommodate any other suitable size or shape as it is known in the art, depending on the needs and/or wants of the user.

Figure 2:
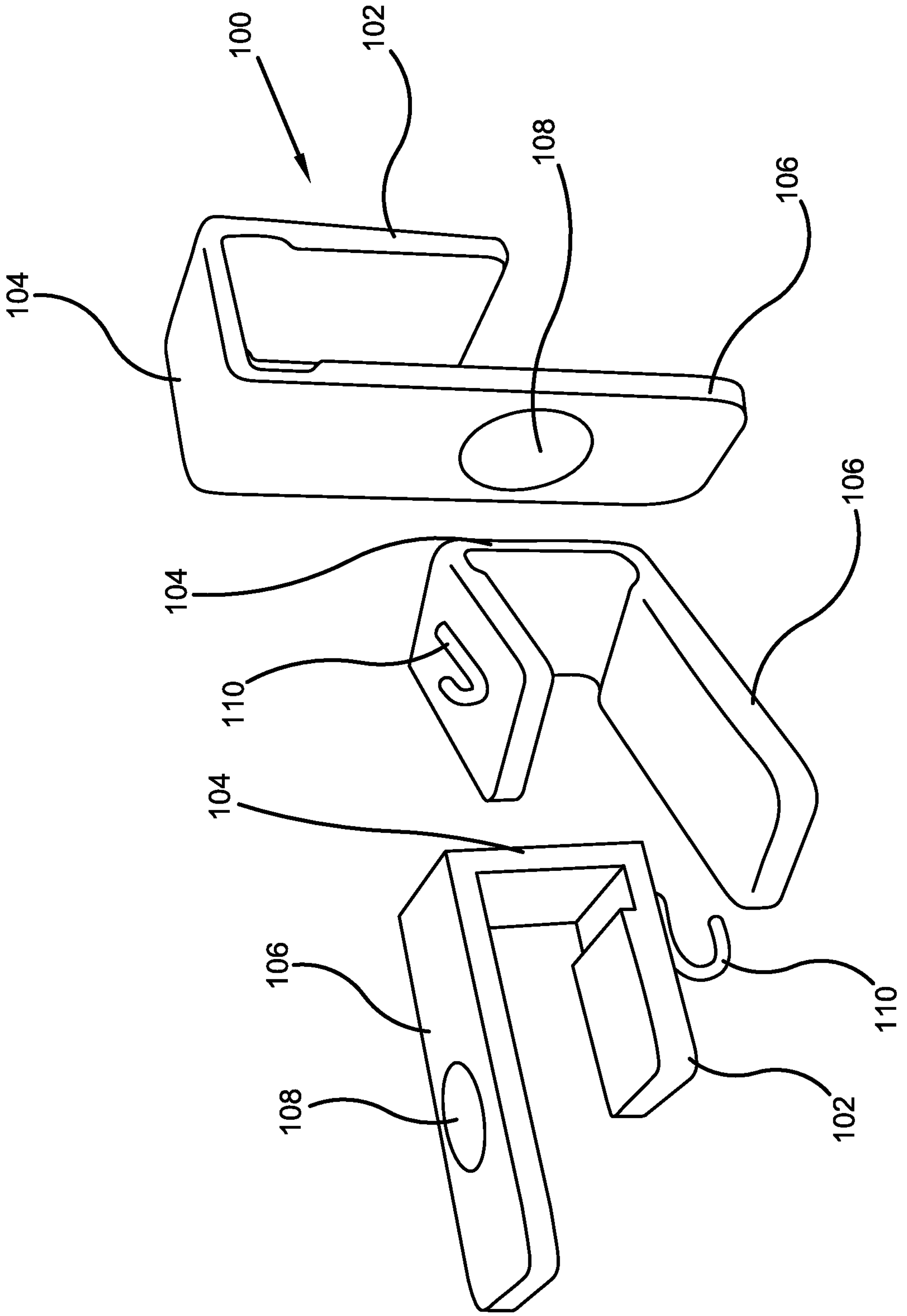
FIG. 2 illustrates a perspective view of various orientations of one potential embodiment of the paint brush storage device of the present invention in accordance with the disclosed architecture.

As shown in FIG. 2 the device 100 is hook shaped and has three main parts. The first leg 102 is the shorter of the two legs. The connector or top portion 104 holds the first leg 102 and the second leg 106 together and maintains the spacing of the first and second legs apart. Each of the first and second legs is disposed perpendicularly to the top portion 104. The second leg is the longer of the two legs and is the leg that houses the magnet 108. The first leg 102 supports a small hook or other attachment element 110 that is designed to hold painting accessories such as, but not limited to, a drip rag, scraper, opener, putty knife or other items that an individual using the invention may require.

In one embodiment, the hook shaped painting accessory or brush holder 100 has dimensions that are designed in accordance with the dimensions of a one-gallon paint can 10. The painting accessory may have an inverted "J" shape. The first leg 102 is designed to be 1.0 to about 2.5 inches long so that it covers about one-third of the total height of the paint can. The second leg 106 is designed to be 3 to about 4.5 inches long so that it is a little longer than half of the total height of the can and almost twice as long as the first leg. The connector 104 between the two legs is designed to be about 0.5 to about 1.5 inches so that it is slightly larger than the rim of the can. The first and second legs remain separated from one another equal to the distance of the top portion. The width of the first leg is between 1 inch and 3 inches and the width of the second leg is between 1 inch and 4 inches. The first and second legs do not have to have the same width or thickness. Generally, the device 100 can be configured in any other suitable shape as is known in the art, and it can be configured in other suitable size or shape as is known in the art, depending on the needs and/or wants of a user.

In one embodiment, the hook shaped painting accessory or brush holder 100 has two types of materials: metal and plastic. The base skeletal structure of the hook is designed to be made out of a metal such as, aluminum, galvanized steel, stainless steel or other rigid non-rusting material. In other embodiments, the hook may be made from a rigid plastic in order to reduce the cost of the invention. The hook may be protected with a plastic covering. This plastic covering will be made of manufactured Polyethylene Terephthalate, High-Density Polyethylene, Low-Density Polyethylene, silicone, or rubber material. The thickness of the protective coating ranges from about 0.25 mils to 2 mils with about 1 mil being preferred. The paint brush storage device can be configured from a plurality of material combinations as is known in the art, depending on the needs and/or wants of a user.

Further, the second leg 106 of the brush hook includes a magnet 108 that holds the paint brush in place. This magnet 108 is relatively small compared to the objects that it is going to be responsible for securing, so it is important that this is a strong magnet. The second leg 106 of the paint brush holder 100 is designed to house a plurality of strong magnets 108 such as, ceramic, alnico, and neodymium magnets. The paint brush storage device's magnet 108 can be configured from a plurality of different types of magnets known in the art, such as ceramic, alnico, or neodymium magnets, depending on the needs and/or wants of the user. The shape is also configurable. The magnet can come in the shape of a circle, as shown, or it can come in a plurality of other different shapes such as, a square, rectangle, triangle, pentagon, hexagon, octagon, etc. The magnet can be configured in a variety of different shapes as known in the art, depending on the needs and wants of the user. In one embodiment, the width of the magnet is less than the width of the ferrule.

Figure 3:
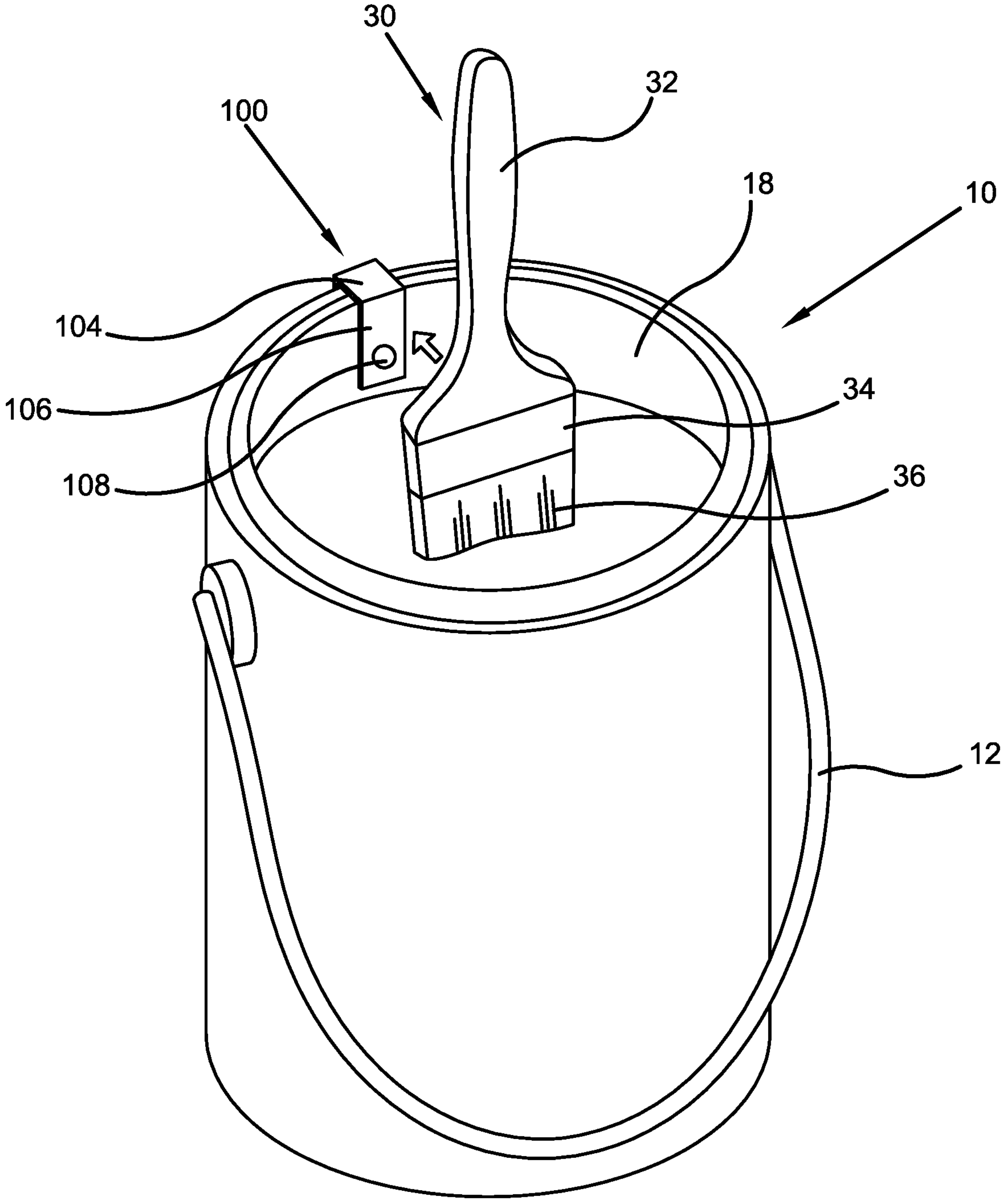
FIG. 3 illustrates a perspective view of one potential embodiment of the paint brush storage device of the present invention with a paint brush being attached to the magnet of the interior leg in accordance with the disclosed architecture.

As shown in FIG. 3, the process to attach the paint brush 30 to the magnet 108 on the second leg 106 of the paint brush hook 100 is relatively simple. In order to secure the brush, the user must hold the brush in a way that the metal connector or ferrule 34 of the paint brush 30 is directly in line with the magnet 108 so as to create a magnetic attraction. Once the metal connector 34 is close enough to the magnetic field produced by the magnet 108, the paint brush will be brought into direct contact with the magnet 108. This secure magnetic connection will hold the paint brush 30 in an upright position so that the handle 32 is facing directly upward and the plurality of bristles 36 is facing directly toward the base of the paint can 12 to maintain the desired configuration of the brush tip. The way that the paint can will be stored will allow any excess paint to drip back into the remaining paint in the can, and it will prevent the bristles of the paint brush 30 from getting bent or permanently damaged.

Figure 4:
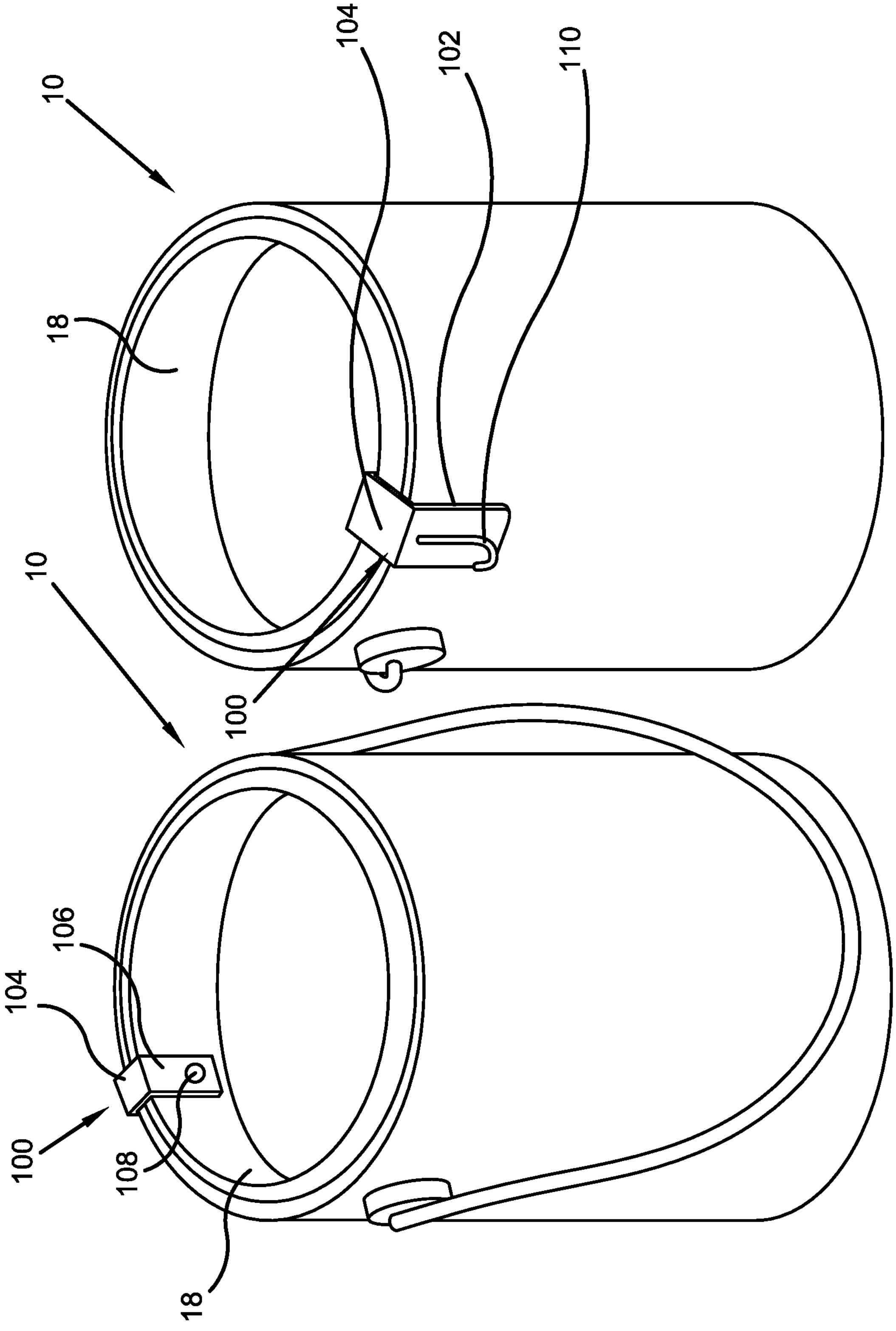
FIG. 4 illustrates a perspective view of one potential embodiment of the paint brush storage device of the present invention with a focus on the positioning of the long leg and the short leg in accordance with the disclosed architecture.

As shown in FIG. 4, both the first leg 102 and the second leg 106 house features of the paint brush storage hook. The first leg rests on the exterior side wall 16 of the paint can 10 and supports the first leg hook 110. The first leg hook 110 allows the user to carry extra painting accessories such as, a drip rag, scraper, opener, putty knife or other items that the painter or individual using the tool may find helpful. The second leg runs along the interior of the paint can 10 and includes the magnet 108. The magnet may be provided in an opening of the second leg or may be provided on the surface of the second leg. The magnet secures the paint brushes 30 so that the bristles 36 do not splay out of alignment or become permanently damaged such as when they are not stored properly. FIG. 4 also shows how the connector or top portion 104 sits along the rim of the can so that the hook is not resting at an angle and remains in its inserted position. The connector or top portion 104 sits flat along the rim so that the hook remains balanced on top of the can rim and does not tip.

Figure 5:
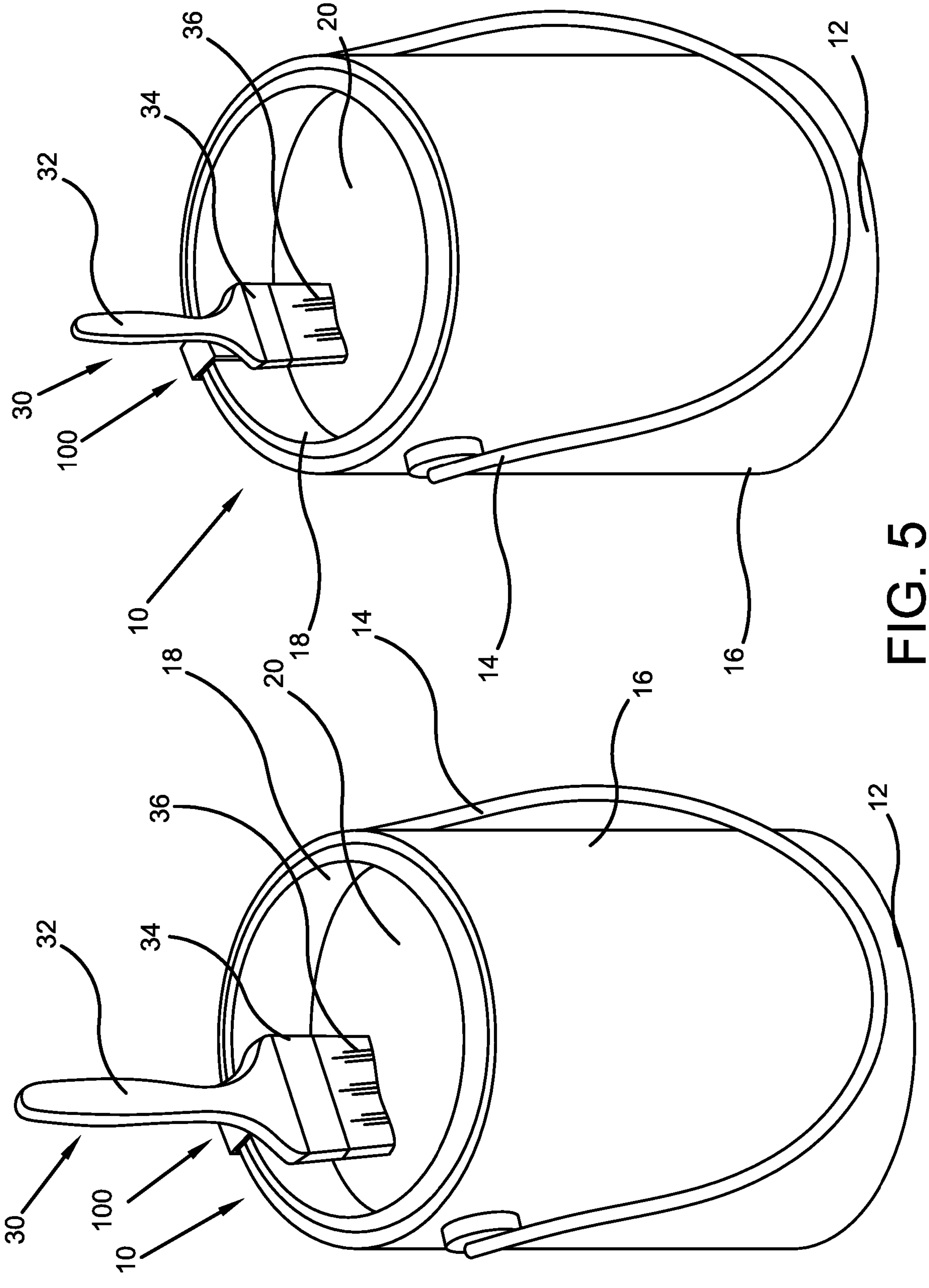
FIG. 5 illustrates a perspective view of one embodiment of the paint brush storage device of the present invention with a focus on the magnet's ability to hold different size brushes in accordance with the disclosed architecture.

As seen in FIG. 5, the paint brush holder 100 is capable of storing a variety of different shapes and sizes of paint brushes 30. The two paint brushes 30 in this figure are both different sizes and in turn different shapes, but the paint brush holder 100 is still capable of storing both brushes. This is achieved mostly by the strength of the magnets 108 that are used in this device. This device uses ceramic, alnico, or neodymium magnets as known in the art, depending on the needs and/or wants of the user. The strength of these magnets 108 allows the magnet 108 to hold the brush 30 in an upright position so the bristles 36 are not bent or damaged.

Figure 6A:
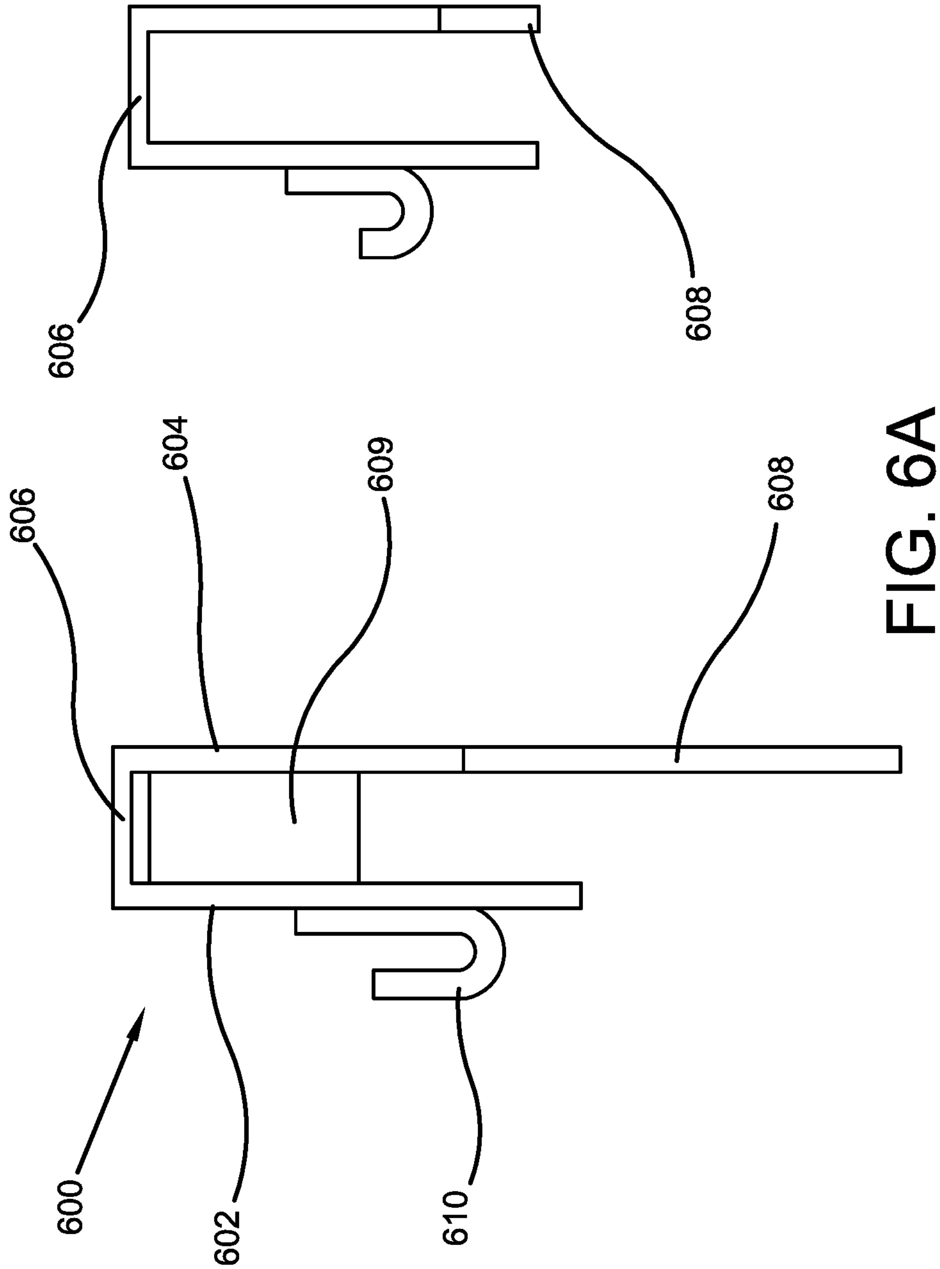
FIG. 6A illustrates a side perspective view of one potential embodiment of the paint brush storage device of the present invention with an extensible member in each of an extended position and a retracted position in accordance with the disclosed architecture.

FIG. 6A illustrates a side perspective view of one potential embodiment of the paint brush storage device 600 of the present invention with an extensible member in each of an extended position and a retracted position in accordance with the disclosed architecture. More specifically, the device 600 is comprised of a first leg 602, a second leg 604, a top portion 606, and an extensible leg 608 that can be extended or retracted to accommodate different depths of paint cans or other receptacles. A spacer element 609 may also be inserted between the first and second legs 602 and 604 if the can has been recently opened and the material is near the top of the can. In this way, the spacer 609 raises up the level of the hook 610 so that when the brush is attached to the second hook, it is not fully submerged in the paint or other material.

Figure 6B:
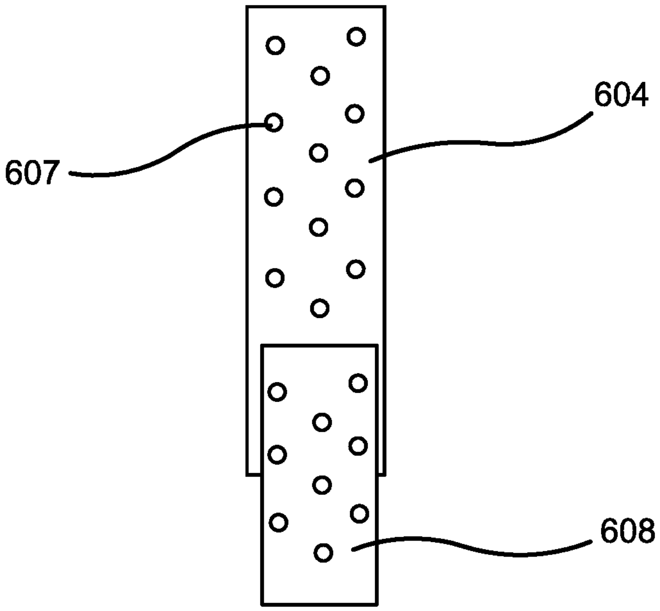
FIG. 6B illustrates a perspective view of one potential embodiment of the paint brush storage device of the present invention having a plurality of apertures or openings in the interior leg in accordance with the disclosed architecture.

FIG. 6B illustrates a front perspective view of one potential embodiment of the second leg 604 and extension portion 608 of the paint brush storage device 600 of the present invention, wherein each of the second leg 604 and the extension portion 608 further comprise a plurality of openings or apertures 607 sized between ⅛" and ¼" to allow paint and other material in the can to flow through the second leg 604 and the extension portion 608. FIG. 6B also illustrates that the extension portion 608 preferably has a smaller width than the second leg 604 so that the extension portion 609 may slide within the second leg 604. In a preferred embodiment, the width of the extension portion 608 is between 80 and 95 percent of the width of the second leg 604.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "paint brush storage device", "paint brush hook", and "device" are interchangeable and refer to the fireworks safety device 100 of the present invention.

Notwithstanding the foregoing, the paint brush storage device 100 of the present invention can be of any suitable size and configuration as is known in the art without affecting the overall concept of the invention, provided that it accomplishes the above-stated objectives. One of ordinary skill in the art will appreciate that the paint brush storage device 100 as shown in FIGS. 1-6B are for illustrative purposes only, and that many other sizes and shapes of the paint brush storage device 100 are well within the scope of the present disclosure. Although the dimensions of the paint brush storage 100 are important design parameters for user convenience, the paint brush storage device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such a term is intended to be inclusive in a manner similar to the term "comprising" as "comprising" is interpreted when employed as a transitional word in a claim.

The invention claimed is:

1. A brush holder comprising:

a first leg having a first length of between 1.0 and 2.5 inches;

a second leg having a second length of between 3.0 and 4.5 inches;

a connector extending between the first leg and the second leg and having a length of about 0.5 to about 1.5 inches, wherein the first and second legs extend perpendicularly from the connector and remain spaced from one another by the length of the connector;

a spacer element insertable between the first and second legs below the connector;

a magnet positioned on the second leg, wherein a width of the first leg is between 1.0 and 3.0 inches and a width of the second leg is between 1.0 and 4.0 inches; and an accessory hook positioned on an exterior surface of the first leg; and wherein the second leg further comprises a plurality of apertures configured to allow a liquid to flow through and an extension leg configured to extend out of and retract into the second leg.

2. The brush holder as recited in claim 1, wherein the brush holder is comprised of a rigid material and is covered with one of a plastic, a rubber, a silicone material or an anti-corrosive coating.

* * * * *